J. S. Thornton,
Wind Wheel,
N° 69,374. Patented Oct. 1. 1867.

Witnesses
F. A. Lehmann
Jno A Ellis

Inventor
Jno Thornton
Per
J H Alexander & Co
attys

United States Patent Office.

JOHN S. THORNTON, OF PORT GIBSON, NEW YORK.

Letters Patent No. 69,374, dated October 1, 1867.

---

IMPROVEMENT IN WINDMILLS.

---

*The Schedule referred to in these Letters Patent and making part of the same.*

---

TO ALL WHOM IT MAY CONCERN:

Be it known that I, JNO. S. THORNTON, of Port Gibson, State of New York, have invented certain new and useful Improvements in Windmills; and I declare the following to be a full, true, and exact description of the same, reference being had to the accompanying drawings, and to the letters of reference marked thereon.

Figure 1:
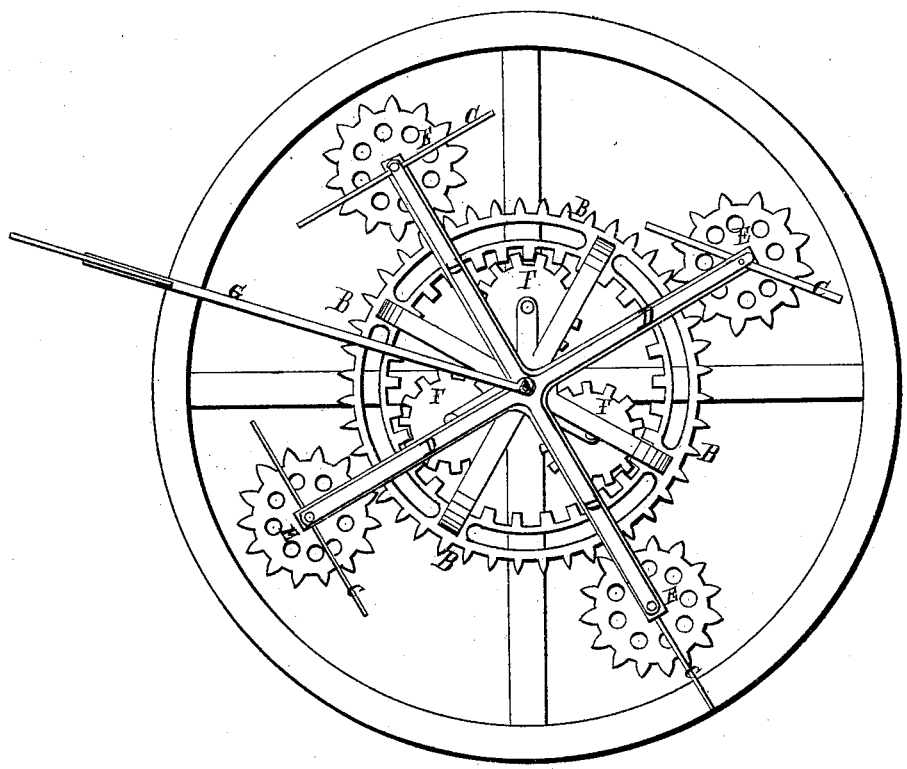
Figure 1 represents a plan view of my machine.
Figure 2:
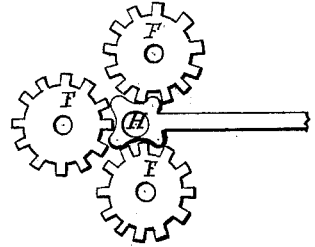
Figure 2 shows the manner in which the stationary sail is connected with the planet-wheel.

Letter A, fig. 1, represents the shaft with and around which the different wheels revolve, and which communicates motion to the machinery of the mill. This shaft should be at least twice the length of the height of the building to which it is attached, so that one-half can run down into the mill, leaving ample space to allow free play to the sails. Revolving around the planet-wheel B there are four movable fans or sails, C, which impart motion to the rest of the machinery. These sails are nearly square in shape, and are made of thin boards, or canvas stretched tightly over frames, being held between the horizontal arms D, which are connected to the shaft A. One of these fans is placed on one side square against the wind, so that the wind presses upon its full surface. The second one, on the opposite side, is placed exactly edgeways to the wind, while the third fan is placed on a mitre, so that when the wind strikes the bevel, it presses it towards the flat fan. The fourth one is behind the shaft, and, like the third, presents a bevel to the wind. Thus there are always three of the fans driving the wheel around, their gearing being so constructed that it forces each fan to take the position of the other when it occupies the same place. Attached to each one of these fans C there is a cog-wheel, E, which revolves around the outer rim of the planet-wheel B, for the purpose of making the fans take the required positions. Letter B represents a large planet-wheel, which is provided with two rims, one upon the outer surface, in which the fan-wheels E play, and one upon its inner surface, around which the cog-wheels F revolve. Letter G represents a stationary sail, which is intended to move only when the wind changes. This sail is held between two horizontal arms, one top and one bottom, like the fans C C. Attached to the end of lower arm there are four cogs, H, as shown in fig. 2, around which the three wheels F revolve. Whenever the wind shifts this sail G changes its position, and in moving imparts motion to the three wheels F, which, in turn, communicate the motion to the planet-wheel B, and thus the fans C are turned in such a position that the wind can caused them to revolve.

The motions of this machine can be governed as readily as those of the steam engine. It can be made to govern itself, it matters not how hard the wind may blow, to any motion that you may desire. It can be stopped or started almost instantly, or the motion can be reversed, when under full speed, by simply moving a lever, which is attached to the centre-wheel, through which the main shaft runs. No change of the wind can affect it in the least, whether in motion or standing still. The power will of course be in proportion to the size of the machine.

Having thus described my invention, what I claim, and desire to secure by Letters Patent, is—

1. The fan-wheels E E, fans C C, and arms D D, constructed and combined substantially as and for the purpose set forth.

2. The fan G, in combination with fans C C, arranged in relation to each other, substantially in the manner and for the purpose specified.

3. The shaft H, combined and arranged with wheels F F and E E, substantially as and for the purpose described.

In testimony that I claim the above I set my signature in presence of two witnesses.

JOHN S. THORNTON.

Witnesses:
J. W. PARKER,
ALLEN Y. GOLDSMIT.